(12) United States Patent
Chen et al.

(10) Patent No.: US 6,934,373 B2
(45) Date of Patent: Aug. 23, 2005

(54) METHOD OF GENERATING CHARGING IDENTIFIER IN INTERNET ONE NUMBER LINK YOU (ONLY) SERVICE

(75) Inventors: Shuiyang Chen, Shenzhen (CN); Haitao Lin, Shenzhen (CN); Wenjun Zhao, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/812,377

(22) Filed: Mar. 29, 2004

(65) Prior Publication Data

US 2004/0179665 A1 Sep. 16, 2004

Related U.S. Application Data

(63) Continuation of application No. PCT/CN02/00409, filed on Jun. 7, 2002.

(30) Foreign Application Priority Data

Sep. 29, 2001 (CN) .................................. 01141648 A

(51) Int. Cl.$^7$ ............................................. H04M 15/00
(52) U.S. Cl. .................. 379/126; 379/124; 379/115.01; 379/114.01
(58) Field of Search ........................... 379/114.01, 124, 379/126.01, 121.01, 115.01, 115.02, 900; 370/352

(56) References Cited

U.S. PATENT DOCUMENTS 6,570,879 B1 * 5/2003 Kikuchi .................. 370/395.21
6,757,290 B1 * 6/2004 Kalmanek et al. ........... 370/401
2002/0101860 A1 * 8/2002 Thornton et al. ............ 370/352

FOREIGN PATENT DOCUMENTS

| CN | 1313694 | 9/2001 |
|----|---------|--------|
| EP | 1133140 | 6/2000 |
| WO | 0035157 | 6/2000 |

OTHER PUBLICATIONS

International Search Report for PCT/CN02/00409, mailed Dec. 12, 2002.

* cited by examiner

*Primary Examiner*—Rexford Barnie
(74) *Attorney, Agent, or Firm*—Harness, Dickey & Pierce P.L.C.

(57) ABSTRACT

The present invention relates to a method for generating a charge ID in Internet ONLY service, generating the charge ID that includes printable characters using a call ID in the IP gateway; the process is simple and resulted charge ID is absolutely unique. Wherein including: configuring the charge ID including 32 printable characters, each of which is represented with 4 binary bits; taking the call ID including 16 characters, each of which is represented with 8 binary bits; corresponding each call ID character with two charge ID characters, wherein the upper four from eight bits of one of the call ID characters referring to 4 binary bits of one of the charge ID characters, the lower four bits corresponding to 4 binary bits of another charge ID character. Because the scope represented by four binary bits is from 0 to 15, the charge ID characters can exactly correspond one by one relationship with printable characters of 0–9 and A–F.

3 Claims, 2 Drawing Sheets

METHOD OF GENERATING CHARGING IDENTIFIER IN INTERNET ONE NUMBER LINK YOU (ONLY) SERVICE

CROSS-REFERENCE TO RELATED APPLICATIONS

This application is a continuation of International Application No. PCT/CN02/00409 filed on Jun. 7, 2002. This application claims the benefit of Chinese Patent Application No. CN 01141648.3 filed on Sep. 29, 2001. The disclosures of the above applications are incorporated herein by reference.

FIELD OF THE INVENTION

The present invention generally relates to IP (Internet protocol) communication technology field, and more particularly, to a new method for generating charge identifier (charge ID) in Internet ONLY (One Number Link You) service, which generates charge ID from call identifier (call ID), and can be used in new IP communication services such as ONLY service.

BACKGROUND OF THE INVENTION

With the development of Internet, more and more Internet subscribers are becoming eager to find a convenient method to communicate with each other and get information rapidly whenever and wherever they want. ONLY service is just such a creative service that syncretizes traditional telecommunication and IP technique to meet these requirements. The kernel of ONLY service is distributing an ONLY number for each subscriber, no matter a phone subscriber or a PC subscriber, and whether online or not he is; with help of ONLY number, the ONLY subscribers can be called correctly via his fixed phones (e.g. office telephones and home telephones), mobile phones (e.g. hand phones), pagers and PC personal computers through the ONLY system, which corresponding to the four services such as phone to phone, phone to PC, PC to phone, PC to PC respectively.

ONLY service mainly aims to solve problems in number, charge, mapping of several phone numbers and move of subscribers during communication between PC subscribers and ordinary phone subscribers. In ONLY service, all that a subscriber has to do is to apply for an ONLY number (a virtual number, for example, a special service number 166 and eight figurexxxxxxxxxthat includes area code). By using the registered ONLY number, other subscribers can contact the subscriber via devices such as telephone and PC wherever he is. Means through which the ONLY subscriber receives messages is customized by himself, and he can contact calling subscriber real time by ways of telephone and PC, or receive messages with voicemail.

In order to realize ONLY service, an ONLY Server (ONLY Server) and a User Server (US) should be configured. ONLY server is used for call control for all service subscribers; if a subscriber, no matter a PSTN subscriber or a PC subscriber he is, dials ONLY number of the called subscriber, the call will be firstly connected to ONLY Server which then goes on subsequence operations according to the customization made by the subscriber in advance to ensure uniform management for PC subscribers and Phone subscribers; User Server (US) is responsible for strategy control of the calls, which can be customized by subscribers (e.g. rule of call forwarding on busy) and stored in ONLY database. When an ONLY call is coming, ONLY Server will inquire User Server which can obtain call route (number) customized by the subscriber in advance through accessing database, and transferred the call to corresponding communication devices. If the called destination is ordinary PSTN phone or mobile phone, the ONLY Server will then initiate calls to IP phone gateway (GW) where the called number locates; if the destination is PC client, ONLY Server will call the called subscriber directly; and the ONLY server will transfer the call to voicemail of the subscriber in case a message is left.

FIG. 1 illustrates the network architecture and calling process of ONLY service. When calling subscriber calls ONLY number, all of which will be routed to ONLY Server 104 through gateway (GW) 102 or 103; ONLY Server 104 sends requests to User Server (US) 105, and User Server (US) 105 obtains the connection actual phone number or IP address based on the present status of the ONLY subscriber and registry data after searching database 106, then returns to ONLY Server 104; under support of Gatekeeper (GK) 101, ONLY Server 104 initiates calls to actual phone number or IP address via gateway (GW) 102 or 103, Public Switched Telephone Network (PSTN) 109 or 123. User Server (US) 105 returns one or more phone numbers, or IP address customized by the called subscriber in advance to ONLY server 104. Telephones 110, 119, Fax 111, 120, Laptop computers 113, 122 and Modems 112, 121 shown in the drawings are all subscriber devices, and 115 is PC client (PCC).

There is a key technique in ONLY Server, which is when the call stops, ONLY Server need sending a charge request package to User Server to generate charge list. The charge request package should comprise a unique and printable charge ID.

In order to satisfy accessing requirements and implement AAA (Authentication, Authorization and Accounting) functions in traditional IP communication service, the International Standard Organization issued RADIUS (Remote Authentication Dial in User Service) protocols that are RFC2138 and RFC2139 in April 1997, and proposed the updated version of the RADIUS protocol in June 2000, which are RFC2865, RFC2866. In RADIUS protocol, the functions of charge ID are described as follows: charge ID should match the opening records and stopping records of a service in the log easily; at same time, the charge ID should be printable.

Generally, a charge ID is generated based on a call ID. And the call ID, which is comprised by 16 characters that is not always printable, is generated according to the H323 protocol. In current gateway, the charge ID is 16 printable characters that generated through a complex algorithm based on the 16 characters in the call ID. This method is not only very complex but also cannot absolutely ensure uniqueness of the charge ID because of its repeat property during the corresponding process.

SUMMARY OF THE INVENTION

It is an object of the present invention to provide a method for creating charge ID in order to satisfy the charge requirements in Internet ONLY service, which can generate an absolutely unique and printable charge ID by means of call ID of the gateway.

Technical scheme used for realizing the object is: a method for creating a charge ID in Internet ONLY service, in which the charge ID is generated from a call ID, wherein includes:

A. Configuring the charge ID which includes 32 printable characters, and each of characters is represented with 4 binary bits;

B. Taking the call ID which comprises 16 characters, and each of characters is represented with 8 binary bits;

C. Corresponding each call ID character with two charge ID characters, the upper four from eight bits of one of the call ID characters corresponding to 4 binary bits of one of the charge ID character, the lower four bits corresponding to 4 binary bits of another charge ID character.

Said upper four from eight bits of the call ID characters corresponding to 4 binary bits of one of the charge ID characters, corresponds to characters 0, 1, 2, 3, 4, 5, 6, 7, 8, 9, A, B, C, D, E, and F respectively; and the lower four bits corresponding to 4 binary bits of another charge ID character, corresponds to characters 0, 1, 2, 3, 4, 5, 6, 7, 8, 9, A, B, C, D, E, and F respectively.

In the step C described above, each call ID character is corresponded to two charge ID characters one by one in the order from the upper four bits to the lower four bits or vice versa.

In the above method, the charge ID that represented with 32 characters is generated from the call ID. All the characters of 0–9, A–F in the charge ID are printable, wherein the upper four from eight bits of each call ID characters referring to one of charge ID characters, the lower four bits corresponding to 4 binary bits of another charge ID character. The process in which the charge ID generated is very simple and rigidly unique.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described in more detail hereinafter with reference to the drawings.

Figure 1:
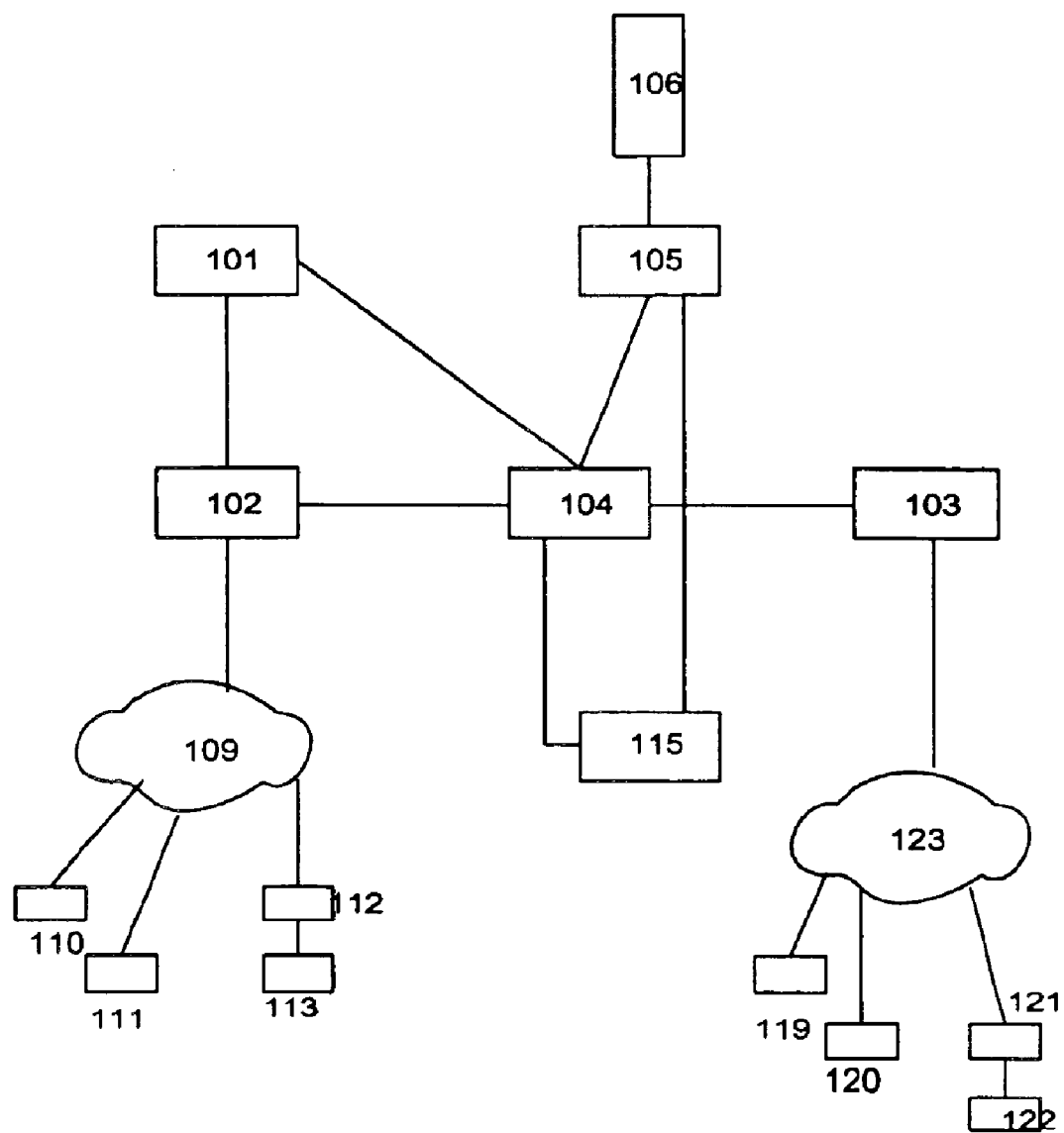
FIG. 1 is a schematic flowchart illustrating the network architecture and calling process for implementing ONLY service through current gateway functions.

Specifications of the FIG. 1 have been discussed above, and will not be described further.

Figure 2:
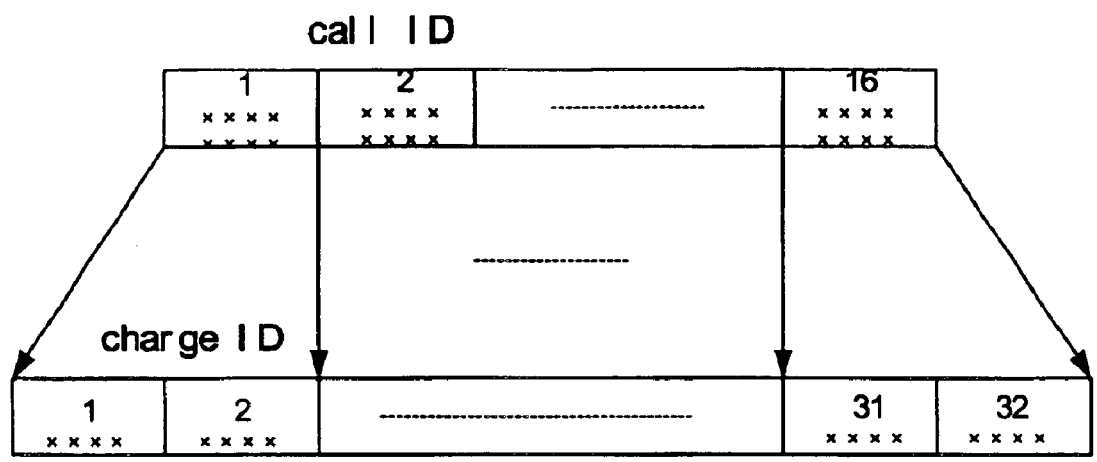
FIG. 2 is a schematic diagram illustrating the structure for generating the charge ID from the call ID in accordance with the present invention.

Now referring to FIG. 2, which shows the generating process of the charge ID from the call ID according to the present invention.

The call ID comprises 16 characters that are from 1 to 16, among which there are some unprintable characters, and each character can be represented with 8 binary bits in forms ofxxxxxxxx.

The charge ID comprises 32 characters that are from 1 to 32, each of which is printable character and can be represented with 4 binary bits in forms ofxxxx.

Each character in the call ID corresponds to two characters in the charge ID, and the corresponding relationship between them is as follows.

The upper four among eight binary bits of a call ID character refers to one of the charge ID characters, and the rest lower four bits correspond to another charge ID character, which means each digit will correspond one by one respectively in the order from the upper four bits to the lower four bits (or vice verse) (random corresponding is not recommended).

In the above method, because the scope represented by four binary bits is from 0 to 15, which corresponding one by one with characters 0–9 and A–F, characters 0–9, A–F are printable characters.

The method for generating charge ID provided according to the present invention can be applied in ONLY service, which shows excellent applicability. Moreover, the method can also be used in any IP communication services where AAA (Authentication, Authorization and Accounting) function is needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for generating a charge ID from a call ID in an Internet ONLY service, comprises:

A. configuring the charge ID including 32 printable characters, wherein each of characters is represented with 4 binary bits;

B. taking the call ID including 16 characters, wherein each of characters is represented with 8 binary bits C. corresponding each call ID character with two charge ID characters, wherein the upper four from eight bits of one of the call ID character corresponds to 4 binary bits of one of the charge ID characters, the lower four corresponds to 4 binary bits of another charge ID character.

2. The method according to claim 1 wherein said upper four from eight bits of each call ID character corresponding to 4 binary bits of one of the charge ID characters, corresponds to characters 0, 1, 2, 3, 4, 5, 6, 7, 8, 9, A, B, C, D, E, and F respectively; and the lower four from eight bits of the call ID characters bits corresponding to 4 binary bits of another charge ID character, corresponds to characters 0, 1, 2, 3, 4, 5, 6, 7, 8, 9, A, B, C, D, E, and F respectively.

3. The method according to claim 1, the step C further comprises, corresponding each call ID character to two charge ID characters one by one in the order from the upper four bits to the lower four bits or vice verse.

* * * * *